United States Patent [19]

Koreska

[11] 4,094,343
[45] June 13, 1978

[54] SLIDING COVER FOR DUPLICATING FLUID RECEPTACLES

[75] Inventor: Peter Koreska, Vienna, Austria

[73] Assignee: Kores Holding Zug AG, Zug, Switzerland

[21] Appl. No.: 761,678

[22] Filed: Jan. 24, 1977

[30] Foreign Application Priority Data

Feb. 4, 1976 Austria ............................... 765/76

[51] Int. Cl.² ............................................. B65B 3/04
[52] U.S. Cl. ..................................... 141/86; 141/392; 285/13
[58] Field of Search .................... 141/392, 85, 86, 87, 141/88, 115, 121, 379, 380, 381; 285/13, 14, 10, 11; 138/103, 105; 222/108

[56] References Cited

U.S. PATENT DOCUMENTS

| 1,216,499 | 2/1917 | Roeffs ................................. 285/13 |
| 4,006,920 | 2/1977 | Sadler et al. ........................ 285/14 |

FOREIGN PATENT DOCUMENTS 123,679  3/1919  United Kingdom .................. 285/13

Primary Examiner—Houston S. Bell, Jr.
Attorney, Agent, or Firm—Ernest F. Marmorek

[57] ABSTRACT

A sliding cover, for use in connection with duplicating ink or dye receptacles of duplicating machines, has an outlet for discharging duplicating ink or dye fluid into a duct for distribution in the duplicating machine, and a reservoir formed about the discharge opening for retaining duplicating fluid that may have leaked from the interconnection.

3 Claims, 4 Drawing Figures

SLIDING COVER FOR DUPLICATING FLUID RECEPTACLES

BACKGROUND OF THE INVENTION

The present invention relates to a sliding cover for receptacles or canisters used on duplicating apparatus, for receiving duplicating fluid such as an ink or dye.

The invention relates more particularly to a sliding cover that has a discharge opening which forms an interconnection with a duct for distribution of dye within a duplicating machine and which has a reservoir formed around the interconnection to retain duplicating fluid which may have leaked from the interconnection.

Dye or ink receptacles, which contain the duplicating fluid for use on duplicating machines, are usually directly inserted into the duplicating apparatus, after their closure has been removed. The duplicating or printing fluid is conducted to the distributing nozzles in the duplicating apparatus by means of a duplicating fluid duct. This is accomplished, depending on the duplicating apparatus, by use of pumps or by forcing the duplicating fluid out of the receptacle, under pressure, and into the ducts.

One particular method of accomplishing the pumping of the fluid is by filling a tube with the duplicating fluid and connecting the tube to a pump.

In simpler duplicating apparatus, a canister is fitted with a sliding bottom. The bottom is pressed up into the canister by means of a piston rod which is normally driven by a screw thread and which results in the fluid being pushed out through a canister nozzle or outlet located in the cover. This nozzle or outlet is interconnected with a duct system through which the fluid is conducted to the distributing nozzles.

Another device employs a base plate which is raised by means of a toothed gearing or similar device and supports the fluid canister. In such a device, the canister is provided with a sliding cover having an opening provided with a lip which can be interconnected with the duct system. In this device, the base plate is raised, the canister is forced to slide up past the sliding cover, whereby the fluid is forced out of the cover opening and into the duct system.

The distributing nozzles are normally arranged between two rollers over which the retiform dye carrier is placed together with the pattern sheet. The pressure on the fluid in the canister distributes the fluid to the nozzles for dispersal.

A problem which is encountered when using the last described method of forcing fluid out of the canister by raising the canister past the cover, is that there occurs leakage of dye or ink past the interconnection of the outlet with the duct. Although toroidal or similarly shaped lips have been used around the discharge opening to help insure a tight interconnection with the ducts, an absolutely fluid-tight closure can thereby not be guaranteed. Any duplicating fluid which leaks from the interconnection has, in the past, at least, caused the machine to become excessively soiled, and required frequent shutdowns to undertake an effective cleaning operation.

It has been found that complete removal of the dye or ink which has leaked into the machine often is not possible and the duplicating devices soon require repair.

SUMMARY OF THE INVENTION

It is one of the principal objects of the instant invention to restrain the leaking or dripping into the duplicating machine of duplicating fluid which has leaked from an imperfect interconnection between the duplicating cover and the ducts in the duplicating machine.

Further objects and advantages of the invention will be set forth in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

The invention accordingly comprises the features of construction, combination of elements and arrangement of parts which will be exemplified in a construction hereinafter set forth and the scope of the application which will be indicated in the claims.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
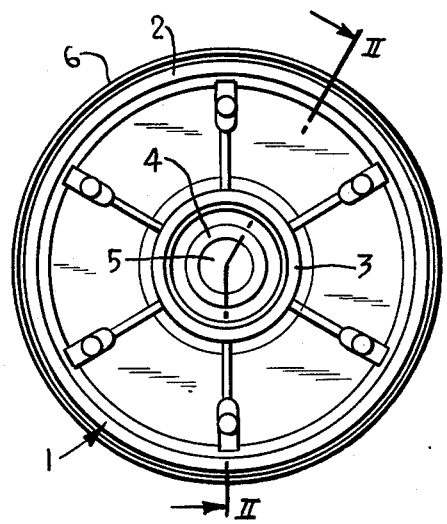
FIG. 1 is a plan view of a sliding cover according to the instant invention.

In carrying the invention into effect in one of the embodiments which has been selected for illustration in the accompanying drawings and for description in the specification, and referring now particularly to FIG. 1 a sliding cover 1 has a ring-shaped edge 2 and a roll-shaped or toroidal shaped raised lip 4 that defines a discharge opening 5. A collar 3 circumferentially surrounds, and is spaced apart from, the lip 4, and forms therebetween a reservoir.

Figure 2:
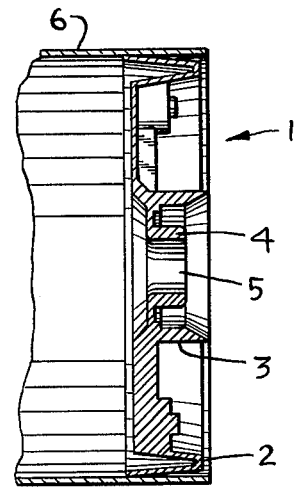
FIG. 2 is a sectional view taken on the line II—II of FIG. 1.

The sliding cover 1 is shown inserted into a cylindrical canister 6 of which only a portion is illustrated in FIG. 2.

As shown in FIG. 2, the collar 3 can be tapered in an upward direction to form a funnel-like structure. The lower portion has a constant thickness.

Operation

Figure 3:
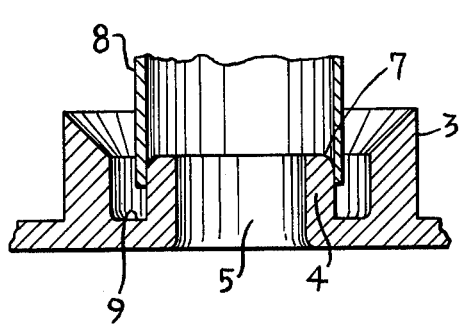
FIG. 3 is a large scale fragmentary sectional view, showing an embodiment of a detail of FIG. 2 together with a portion of a distribution duct.
Figure 4:
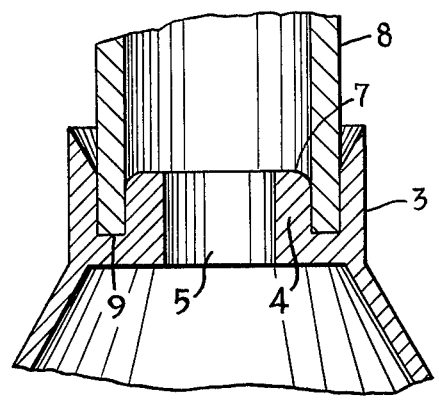
FIG. 4 is a large scale fragmentary sectional view, similar to FIG. 3, but showing a preferred further embodiment of such detail.

The operation of the above described embodiment of the invention is as follows:

The raised lip 4 is shown with a toroidal shape 7 which aids in forming a fluid-tight seal with the fluid distribution duct 8 of the duplicating machine. In accordance with the embodiment shown in FIG. 3, the fluid distribution duct 8 when mounted on the lip 4 does not extend across the annular reservoir 9 between the collar 3 and the lip 4; and therefore there is left a gap between the external surface of the duct 8 and the internal surface of the collar 3. In a preferred embodiment shown in FIG. 4, however, the duct 8 and the reservoir 9 are so dimensioned that the duct 8 when mounted on the lip 4 extends across the reservoir 9.

As can easily be seen in the sectional view of FIG. 2, if there is a small amount of leakage from the interconnection between the raised lip 4 and the duct, it will accumulate in the reservoir 9 that is formed by the raised lip 4 and the collar 3, and it can be easily removed from the reservoir 9.

Although the sliding cover 1 is shown having a circular shape with a discharge opening 5 that is formed in the middle, other forms can be easily envisioned by a person of ordinary skill in the art, and as required by the shape of the duplicating fluid canister 6. The circular form, as shown, is the simplest and least expensive to manufacture.

I wish it to be understood that I do not desire to be limited to the exact details of construction shown and described, as obvious modifications will occur to a person skilled in the art.

Having thus described the invention, what I claim as new and desire to be secured by Letters Patent is as follows:

1. In a sliding cover, for use in connection with a duplicating fluid canister of a duplicating machine and including outlet means for discharging the fluid into a duct for distribution in the duplicating machine;
    said outlet means comprising a raised lip forming a discharge opening and being operative to form an interconnection with the duct; and
    a collar formed by a tapering wall thereby defining an outwardly flaring funnel, said collar circumferentially surrounding and being spaced apart from said raised lip defining with said lip a reservoir for retaining duplicating fluid which may have leaked from the interconnection whereby any duplicating fluid leaked into said reservoir is easily removable therefrom.

2. A sliding cover as claimed in claim 1, wherein said lip has a toroidal shaped upper exterior surface to facilitate forming said interconnection; and said collar is ring shaped.

3. A sliding cover, as claimed in claim 1, said wall of said collar having a lower portion of substantially constant thickness.

* * * * *